United States Patent
Baskaran et al.

(10) Patent No.: US 11,496,882 B2
(45) Date of Patent: Nov. 8, 2022

(54) METHOD TO SELECT THE RIGHT UDM INSTANCE AND ENSURE THE UDM INSTANCE SECURITY

(71) Applicant: NEC Corporation, Tokyo (JP)

(72) Inventors: Sheeba Backia Mary Baskaran, Tamil Nadu (IN); Anand Raghawa Prasad, Tokyo (JP); Sivakamy Lakshminarayanan, Tamil Nadu (IN); Sivabalan Arumugam, Tamil Nadu (IN); Hironori Ito, Tokyo (JP); Takihito Yoshizawa, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/968,624

(22) PCT Filed: Feb. 15, 2019

(86) PCT No.: PCT/JP2019/005464
§ 371 (c)(1),
(2) Date: Aug. 10, 2020

(87) PCT Pub. No.: WO2019/160069
PCT Pub. Date: Aug. 22, 2019

(65) Prior Publication Data
US 2021/0051468 A1    Feb. 18, 2021

(30) Foreign Application Priority Data
Feb. 16, 2018   (IN) .............................. 201841005986

(51) Int. Cl.
*H04W 60/00*    (2009.01)
*H04W 8/20*    (2009.01)
(Continued)

(52) U.S. Cl.
CPC ............. *H04W 8/205* (2013.01); *H04W 8/08* (2013.01); *H04W 48/16* (2013.01); *H04W 60/00* (2013.01); *H04L 2101/654* (2022.05)

(58) Field of Classification Search
CPC ....... H04W 8/205; H04W 8/08; H04W 48/16; H04W 60/00; H04W 8/18; H04W 8/04; H04L 61/6054
See application file for complete search history.

(56) References Cited

U.S. PATENT DOCUMENTS

2018/0227872 A1*  8/2018  Li ......................... H04W 60/04
2019/0182654 A1   6/2019  Jerichow et al.

FOREIGN PATENT DOCUMENTS

WO      2019144321 A1    8/2019

OTHER PUBLICATIONS

Ericson, NF discovery with SUCI, Jan. 22-26, 2018, 3GPP TSG SA WG3 (Security) Meeting #90, S3-180267, Gothenburg, Sweden (Year: 2018).*

(Continued)

*Primary Examiner* — Said M Elnoubi

(57) ABSTRACT

Methods for (i) finding/discovering the right UDM instances and (ii) ensuring the UDM instance security are provided. The method for (i), includes the steps of: (i-1) pre-provisioning of UDM instance discovery information/parameters to the UE/USIM, (i-2) sending the UDM instance discovery related parameters to a core network element, and (i-3) discovering the right UDM instance at the core network element based on the discovery parameters and related routing information either at the UDM consumer/NRF. The method for (ii) includes the steps of: (ii-1) Secured choice of parameter for UDM instance discovery (e.g. UDM instance identifier) to the core network element and (ii-2) the secured UDM instance identifier generation and management at the UDM to prevent attack on UDM instances. Also a method (Continued)

to identify the cleartext IMSI/SUPI is provided for the re-authentication scenario along with the relevant procedures.

24 Claims, 8 Drawing Sheets

(51) Int. Cl.
  *H04W 8/08* (2009.01)
  *H04W 48/16* (2009.01)
  *H04L 101/654* (2022.01)

(56) References Cited

OTHER PUBLICATIONS

3GPP TS 33.501 V0.0.7.0 , Technical Specification Group Services and System Aspects; Security architecture and procedures for 5G system (Release 15) , Jan. 2018 (Year: 2018).*
Extended European Search Report for EP Application No. EP19753935.6 dated Mar. 10, 2021.
3rd Generation Partnership Project; Technical Specification Group Services and System Aspects; Security Architecture and Procedures for 5G System (Release 15), 3GPP TS 33.501 V0.6.0, pp. 1-79, Jan. 4, 2018.
Nokia, "SIDF functionality",3GPP Draft; S3-173118, 3GPP TSG SA WG3 (Security) Meeting #89, Nov. 20, 2017 USA.
Japanese Office Action for JP Application No. 2020-540648 dated Aug. 17, 2021 with English Translation.
Ericsson et al., "TS 23.501: OI3a: UDM/UDR selection and discovery", 3GPP SA WG2 Meeting S2-124, S2-178571, Nov. 27-Dec. 1, 2017, USA, pp. 1-4.
3GPP TS 23.501 V15.0.0 (Dec. 2017), Technical Specification, 3rd Generation Partnership Project; Technical Specification Group Services and System Aspects; System Architecture for the 5G System; Stage 2 (Release 15), Dec. 22, 2017.
3GPP TS 23.502 V15.0.0 (Dec. 2017), Technical Specification, 3rd Generation Partnership Project; Technical Specification Group Services and System Aspects; Procedures for the 5G System; Stage 2 (Release 15), Dec. 22, 2017.
Ericsson, NF Discovery with SUCI; 3GPP TSG SA WG3 (Security) Meeting #90 2, Gothenburg, Sweden, S3-180267, revision of S3-17xabc; Jan. 15, 2018.

* cited by examiner

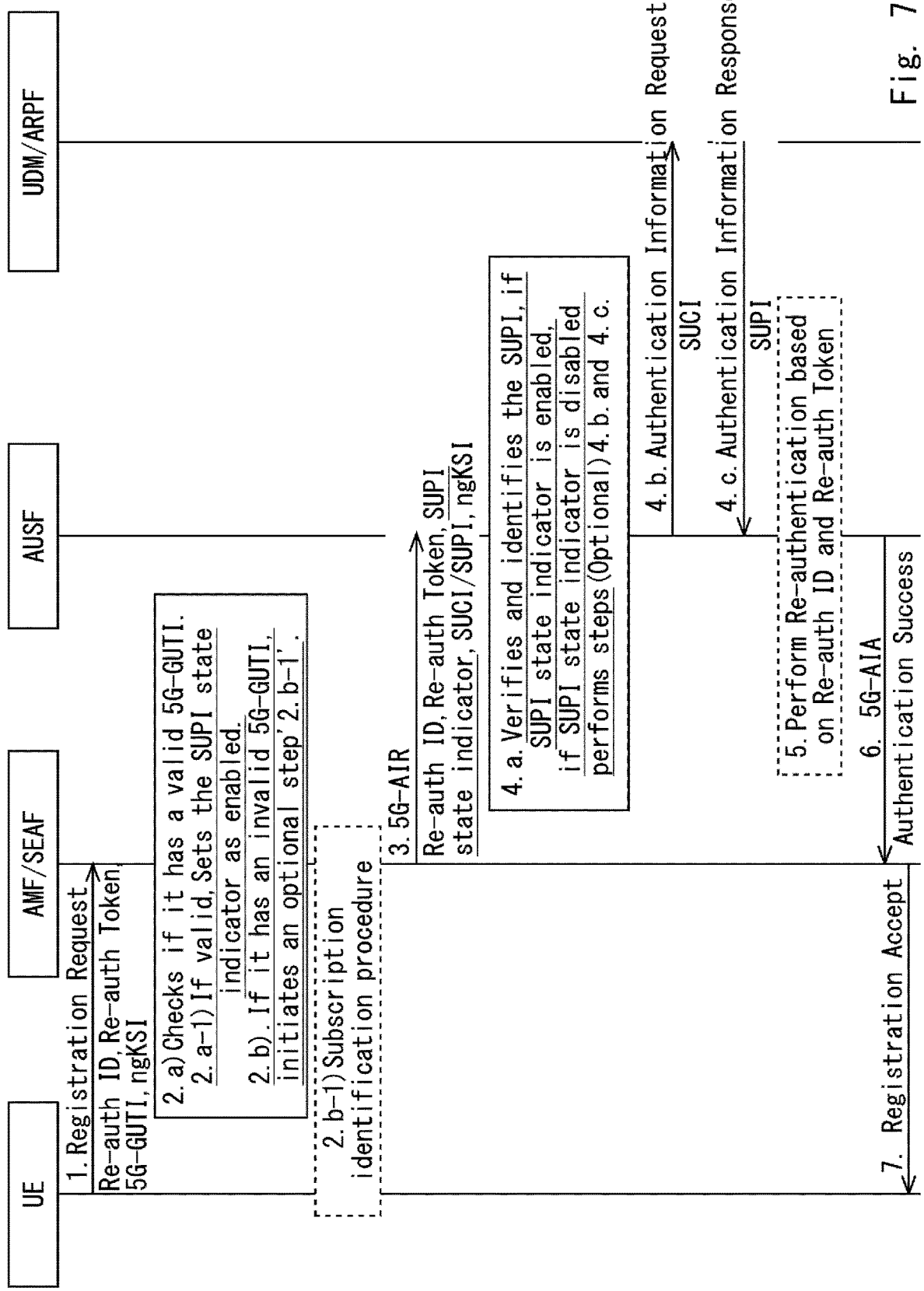

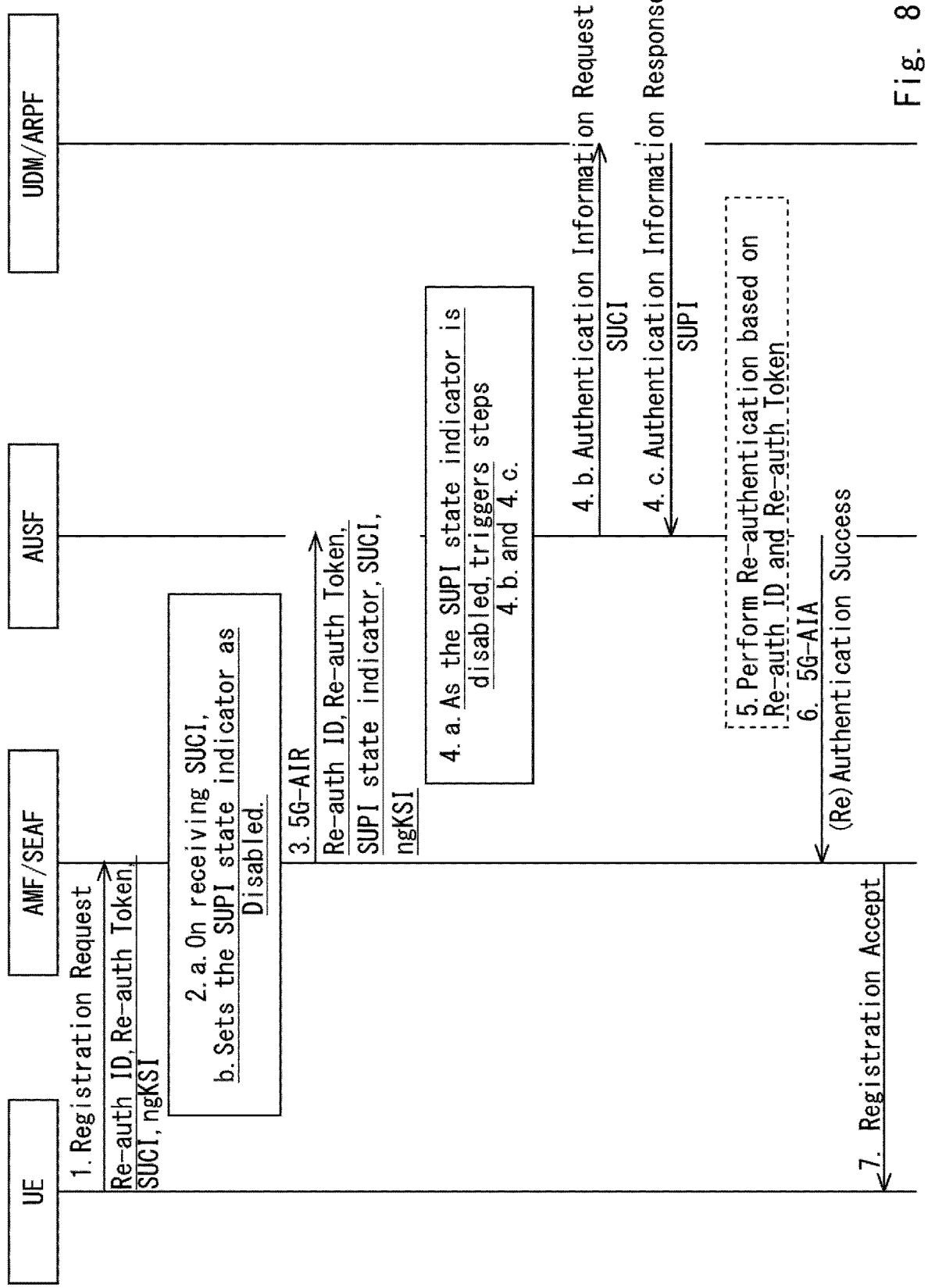

US 11,496,882 B2

METHOD TO SELECT THE RIGHT UDM INSTANCE AND ENSURE THE UDM INSTANCE SECURITY

This Application is a National Stage Entry, under 35 U.S.C. § 371, of International Application No. PCT/JP2019/005464, filed on Feb. 15, 2019, which claims priority from India Patent Application 201841005986, filed Feb. 16, 2018, the disclosures of which are incorporated herein by reference in their entireties.

TECHNICAL FIELD

This disclosure is related to a method to select the right UDM instance and ensure the UDM instance security.

BACKGROUND ART

In the current system, a User Equipment (UE) sends the Subscription Permanent Identifier (SUPI) in a concealed form as Subscription Concealed Identifier (SUCI) in the registration request to a core network element leaving a Unified Data Management (UDM) instance discovery a major issue.

SUMMARY OF INVENTION

Technical Problem

The disclosure solves the issues related to the following two different problem scenarios.

Scenario 1: The disclosure solves the following two problems related to the UDM instance discovery process based on the UDM instance discovery related information received from the UE and the UDM instance related routing information configured at the UDM consumer(s) or Network Repository Function (NRF).

1) Lack of sufficient UDM instance discovery/routing information at SUCI: As the SUbscription Concealed Identifier (SUCI) is a one-time use subscription identifier, which contains the concealed subscription identifier, e.g., MSIN, using of SUPI ranges to discover the UDM instances is not feasible. More over as the SUCI contains only the Mobile Country Code (MCC) and Mobile Network Code (MNC) in the unencrypted form it can be used only to find a single UDM and further as such it cannot be used to identify the UDM instances if the UDM has multiple UDM instances.

2) Lack of integrity and confidentiality protection for UDM instances and UDM instance identifiers: If the UDM instance IDs are used as UDM discovery information and sent on air by the UE to the core network element, the attackers with malicious intent can capture as well as modify the UDM instance identifiers to perform denial-of-service (DoS) or exploit any UDM instances respectively. This should not potentially give way to UDM instance attack/failure at the core network.

Scenario 2:

The UE may send either the SUCI or Globally Unique Temporary UE Identity (5G-GUTI) in the registration request message to the Access and Mobility Management Function (AMF)/SEcurity Anchor Function (SEAF) and the AMF/SEAF may send an Authentication Initiation Request (5G-AIR) message to the AUSF. The AMF/SEAF may include the SUPI in the 5G-AIR message in case the SEAF has a valid 5G-GUTI, and re-authenticates the UE. Otherwise the SUCI is included in 5G-AIR. The current system does not define how the Authentication Server Function (AUSF) can determine whether the SUPI is in cleartext or in concealed form. The disclosure solves the following two problems related to this issue.

1) Lack of SUPI State (Concealed/Cleartext) Information for AUSF:

While a SUPI is carried in the 5G-AIR message during a re-authentication, the lack of SUPI's state information (cleartext or concealed form) will lead to AUSF relying on the Subscription Identifier De-concealing Function (SIDF)/UDM for SUPI identification. This incurs unnecessary additional messages and access latency during a re-authentication.

2) Lack of Clear Re-Authentication Procedure:

The current TS 33.501 confirms the existence of re-authentication, but it has not discussed the re-authentication security procedure for the 5G system.

A detailed description of the solutions corresponding to the scenario 1 and 2 are presented as follows in subsection 2.1 to 2.4.

Solution to Problem

A method for pre-provisioning an UDM instance discovery/routing information to a mobile communication device/Universal Subscriber Identity Module (USIM), by the core network element/operator/or any other, according to a first exemplary aspect of the present disclosure includes pre-provisioning of UDM instance discovery/routing information to the mobile communication device/USIM by the core network, wherein the UDM instance discovery/routing information may be any one or combination of the following parameters, a) UDM Identifier and Instance number
b) IMSI or SUPI Range indicator
c) Access/IMSI types
d) Protection scheme
e) Service type
f) A random number.

BRIEF DESCRIPTION OF DRAWINGS

FIG. 7 is Usage of SUPI State Indicator during Registration with 5G-GUTI.

FIG. 8 is Usage of SUPI State Indicator during Registration with 5G-GUTI.

DESCRIPTION OF EMBODIMENTS

The following abbreviations and terminology are used in the current disclosure:

| | |
|---|---|
| AIA | Authentication Initiation Answer |
| AIR | Authentication Initiation Request |
| AMF | Access and Mobility Management Function |
| ARPF | Authentication credential Repository and |

-continued

| | Processing Function |
|---|---|
| AUSF | Authentication Server Function |
| GUTI | Globally Unique Temporary UE Identity |
| MCC | Mobile Country Code |
| MNC | Mobile Network Code |
| NF | Network Function |
| NG | Next Generation |
| ngKSI | Key Set Identifier in 5G |
| NRF | Network Repository Function |
| NSSAI | Network Slice Selection Assistance Information |
| Re-auth ID | Re-authentication Identifier |
| Re-auth Token | Re-authentication Token |
| SEAF | SEcurity Anchor Function |
| SIDF | Subscription Identifier De-concealing Function |
| S-NSSAI | Single Network Slice Selection Assistance Information |
| SUCI | Subscription Concealed Identifier |
| SUPI | Subscription Permanent Identifier |
| UE | User Equipment |
| UDM | Unified Data Management |
| UDM ID | UDM Identifier |
| UDM IID | UDM Instance Identifier |
| UDR | Unified Data Repository |
| USIM | Universal Subscriber Identity Module |
| UCF | UDM catalogue function |

Figure 1:
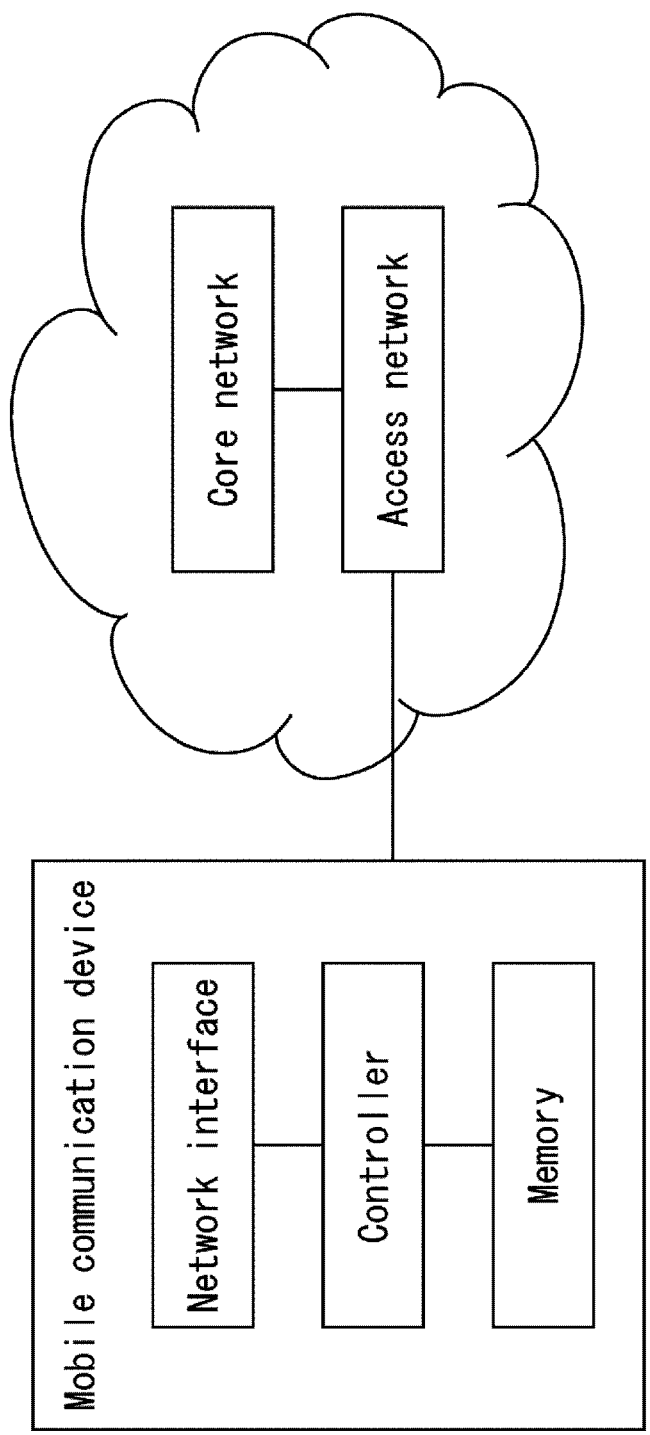
FIG. 1 is a block diagram illustrating a mobile communication environment according to an embodiment of the disclosure.

FIG. 1 is a block diagram illustrating a mobile communication environment according to an embodiment of the disclosure. In the mobile communication environment, the mobile communication device is wirelessly connected to the service network for obtaining mobile communication services. For example, the mobile communication device may be a user equipment (UE), a mobile phone, a smartphone, a laptop computer, a panel PC, an IoT (Internet of Things) device, or any computing device supporting at least a Radio Access Technology (RAT) utilized by the service network. The RATs includes the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, Time Division-LTE (TD-LTE) technology, or next generation (5G) technology and others. The service network comprises an access network and a core network, wherein the access network is responsible for processing radio signals, terminating radio protocols, and connecting the mobile communication device with the core network, and the core network is responsible for performing mobility management, network-side authentication, and interfaces with public networks. In one embodiment, the service network may belong to a PLMN, and the access network may include multiple RAs or TAs, wherein each RA or TA is formed by a group of base stations.

For example, if the service network is a WCDMA system, the access network may be a Universal Terrestrial Radio Access Network (UTRAN) which includes at least a Node-B (NB) and a Radio Network Controller (RNC), and the core network may be a General Packet Radio Service (GPRS) core which includes a Home Location Register (HLR), at least one Serving GPRS Support Node (5GSN), and at least one Gateway GPRS Support Node (GGSN). Alternatively, if the service network is an LTE/LTE-A system, the access network may be an Evolved-UTRAN (E-UTRAN) which includes at least an evolved NodeB (eNB), and the core network may be an Evolved Packet Core (EPC) which includes a Home Subscriber Server (HSS), Mobility Management Entity (MME), Serving Gateway (S-GW), and Packet Data Network Gateway (PDN-GW or P-GW). Further alternatively, if the service network is a next generation system (5GS), the access network may be a 5G-Access Network (5G-AN) or (Radio) Access Network ((R)AN) which includes at least a gNB, and the core network may be a 5G Core Network (5GC) which includes an Access and Mobility Management Function (AMF), Security Anchor Function (SEAF), Authentication Server Function (AUSF), Unified Data Management (UDM), Subscription Identifier De-concealing Function (SIDF), and Authentication Credential Repository and Processing Function (ARPF).

Although not shown, the mobile communication device may be wirelessly connected to more than one service network. For example, each of the plurality of service networks may belong to a respective public land mobile network (PLMN), so that the mobile communication device may select one of the PLMN to obtain the wireless services.

The mobile communication device comprises a network interface for performing the functionality of wireless transmission and reception to and from the service network via an antenna, a controller for controlling the operation of the network interface and other functional components, such as a display unit and/or keypad serving as the Man-Machine Interface (MMI), and a memory storing instruction sets and/or program codes of applications and communication protocols, or others. More specifically, the controller controls the network interface for performing the methods of the disclosure for indicating an Identifier protection scheme.

2.1 Solution for Lack of Sufficient UDM Instance Discovery Information at SUCI

The UDM routing information may be pre-configured in the core network elements such as Network Repository Function (NRF) or AUSF or SEAF or SIDF or in any Network Function (NF)/UDM consumer to support UDM/UDM instance discovery using any one or combination of the following parameters. The UDM routing/selection/discovery information may pre-provisioned to the UE. The UE may send the UDM instance discovery/routing information/parameter in the registration request or any other request to the core network element, the request including any one, part(s) of one or combination of the following parameters related to UDM instance selection/discovery/routing.

The UDM consumer may be an AMF or SEAF or AUSF or SIDF or any network element.

These UDM/UDM instance selection/discovery/routing parameters may be an individual or sub-parameter of SUCI.

1. The UDM Instance Identifier (UDM IID)

The entire UDM instance identifier or part of the UDM IID (partial UDM IID) may be used as the routing information to discover the right UDM/UDM instance.

The complete UDM IID or partial UDM IID may be pre-shared by the core network element to the UE/USIM while sending the SUPI protection scheme related information.

Variant 1: The UDM IID selection for pre-sharing with the UE may be based on the subscription/SUPI/protection scheme.

While sending the SUCI in the registration request message, UE may also send the received/configured UDM IID related information along with the SUCI as an individual parameter or a sub-parameter of SUCI to the AMF/SEAF.

The AMF/SEAF may forward the UDM IID along with the SUCI to the AUSF in the 5G-Authentication Initiation Request (5G-AIR) message.

The UDM consumer may use the UDM IID as the routing information to discover the right UDM.

Variant 1: The UDM consumer may be preconfigured with the UDM IID, UDM ID related routing information to discover the right UDM.

Variant 2: The NRF may be configured with the UDM IID, UDM ID related UDM routing/discovery information and the NRF helps the UDM consumer to discover the right UDM instance.

2. Access/International Mobile Subscriber Identity (IMSI) Types

The UDM consumer may be preconfigured with the UDM discovery and routing information specific to the access type/IMSI type of the subscriber sending the registration request message.

Variant: The NRF may be configured with the Access type/IMSI type related UDM routing/discovery information (UDM instance identifiers and/or UDM identifiers) and the NRF helps the UDM consumer to discover the right UDM instance based on the received Access type/IMSI type.

The UE sending the registration request message may include access type/IMSI type as the routing information to support UDM discovery by the UDM consumers.

Variant: The UDM consumer receiving the UE's registration request message will identify the IMSI type based on the access type notified in the registration request message and discover the right UDM instance based on the preconfigured UDM instance routing information related to the access type/IMSI type accordingly.

3. Protection Scheme

The UDM consumer may be pre-configured with the UDM routing information specific to the SUPI protection schemes supported by the UDM/ARPF and/or the UE.

Variant: The NRF may be configured with the SUPI protection schemes related UDM routing/discovery information (UDM instance identifiers and/or UDM identifiers) and the NRF helps the UDM consumer to discover the right UDM instance based on the protection scheme indicated in the SUCI in the registration request message.

The UE sending the registration request message may include the SUPI protection scheme as the routing information to support the UDM consumer to discover the right UDM instance.

4. IMSI or SUPI Range Indicator

The UDM/ARPF which stores the UE subscription information such as IMSI/SUPI may classify the SUPIs based on the subscription information and set a SUPI RANGE INDICATOR corresponding to a set of SUPIs and provide (pre-provision) the SUPI RANGE INDICATOR to the corresponding UE/USIM along the SUPI protection scheme parameters or in any other way according to the operator's implementation specific way.

The UE may send the SUPI RANGE INDICATOR as UDM discovery/routing information as an individual parameter or sub-parameter of SUCI while sending the registration request to the network.

The UDM consumer or NRF may be preconfigured with the SUPI RANGE INDICATOR and the relevant routing information to discover the right UDM instance.

The UDM consumer may discover the right UDM by itself using its preconfigured information or through the NRF based on the SUPI RANGE INDICATOR received from the UE.

5. Service Type

The UDM consumer or NRF may be configured with the Service type specific UDM discovery information.

Based on the service type (NSSAI/S-NSSAI) requested in the UE registration request message or in any other message, the NF consumer may by itself or through the NRF discover the right UDM (instance).

Common Variant: The UDM consumer or NRF may consider any one, part of (one) or combination of the above parameters to discover the right UDM instance.

6. Random Number—As a UDM Routing Information for Single UDM Deployment Scenario In case of single UDM deployed in a home operator network, a random number may be assigned to a SUPI as an UDM routing/discovery/selection information and may be pre-provisioned to the UE. The corresponding UE/USIM by the core network element such as UDM/ARPF. The UE may include this random number in the SUCI in the registration request or any message to the AMF/SEAF. Then the UDM consumer such as AMF/SEAF/AUSF/SIDF may discover the single UDM based on the random number sent by the UE and UDM routing information pre-configured at the UDM consumer or using the NRF.

Advantage: Usage of random number as UDM selection/discovery information in SUCI may improve the UDM security by preventing the attacker's (sniffers over the air) from understanding the UDM related information (such as location information, topology etc.). and their association with the subscribers. This prevents the attack on specific UDM.

2.1.1 SUCI UDM Catalogue Information and UDM Instance Discovery—Related Variants UDM Catalogue Information:

The UDM catalogue function/Information may contain the detailed information about the UDM and its instances in an Operator domain (either shared or independent) to support the discovery or selection of the right UDM or UDM instance(s).

Every UDM may have an unique UDM identifier (UDM ID) specific to an Operator domain which has the control of it's UDM instances.

Every UDM instance within an UDM may have an unique UDM Instance identifier (UDM IID).

A UDM catalogue function (UCF) or information may also serve as an UDM (instance) discovery function (UDF) at the UDM consumers.

The UCF or UDM catalogue information may be offered by NRF to discover the right UDM instance based on the subscription, security requirements, service requirement, UDM load etc. The UCF managed at the NRF may be updated by the corresponding UDM whenever there is a change in the UDM instances and its related functionality and service.

UCF or/and UDF may be a single entity/instance/service/function or separate entity/instance/service/function.

The UDM catalogue function may manage the necessary (routing) information to select/discover the right UDM instance.

The information in an UDM catalogue function (UCF) may contain in addition to the UDM discovery parameters listed in section 2.1, other parameters such as, the UDM ID and/or UDM IID(s) along with the information for discovery of an UDM such as, a. UDM (Instance) Functionality,
b. authentication method types,
c. privileged subscriptions,
d. normal subscriptions,
e. subscription types,
f. IMSI/SUPI range identifiers
g. Service types
h. UDM/UDM instance Invocation count (Maximum limit set to avoid Distributed Denial-of-Service (DDoS), Invocation count may be specific to Subscription/Service/NF/Trust level/Trust Zone/Time/duration for home network/home network handling visitor network requests (invocation count specific to visitor network and its services)

The invocation count/threshold may be set for a particular period of time, Minimum interval between invocations that are similar in all aspects (such as source, subscription etc.), Network functions with access privilege level, Subscription and access privilege level and a Tag/Reference/information to identify the UDM instance corresponding to an function.

Figure 2:
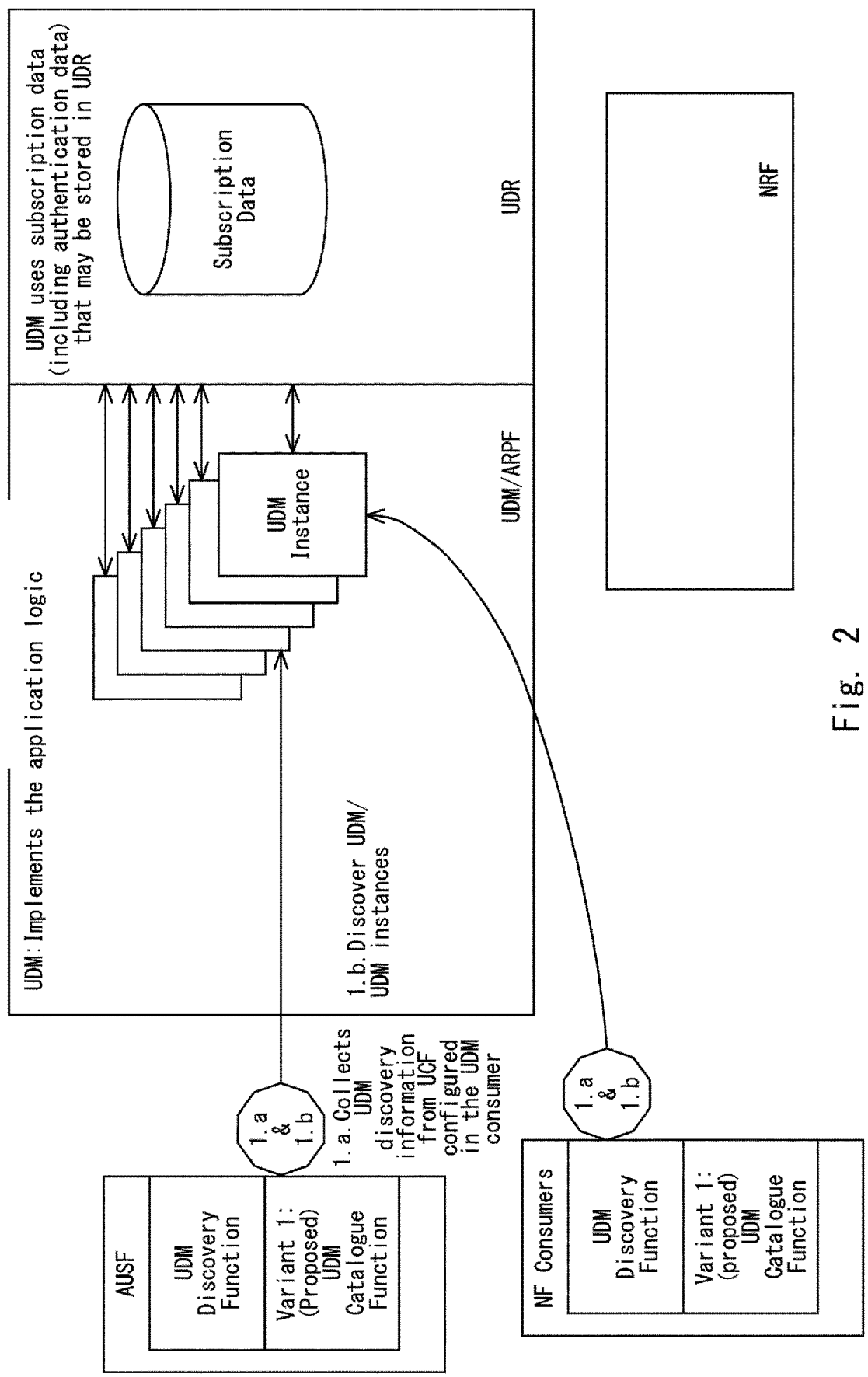
FIG. 2 is UCF based UDM instance discovery by AUSF or any NF consumer.

2.1.1.1 UDM Catalogue Information Related Variant-1:

The AUSF or any UDM consumer may discover the UDM instance based on the UDM catalogue function or information as shown in FIG. 2. A dedicated UDM Catalogue function/information may be configured in the UDM consumers to support right UDM instance discovery/selection based on the service requirement and other specific parameters managed by the UCF as stated in section 2.1.1.

Whenever a UE's registration request or any request is received by an UDM consumer with any one or combination of UDM routing information parameter listed in section 2.1, the UDM consumer may identify the UDM routing information or discovery information notified by the UE in the SUCI or any parameter in the request and then perform step 1 a and 1b as shown in FIG. 2 to discover the right UDM instance. The Unified Data Repository (UDR) supports the storage and retrieval of subscription data by the UDM.

2.1.1.2 UDM Catalogue Information Related Variant-2:

The UDM Catalogue function/information may be configured in the NRF to support the discovery of right UDM instance by the NF consumers. The AUSF or any UDM consumer may discover the UDM instance based on the UDM catalogue function or information managed by the NRF as shown in FIG. 3.

Figure 3:
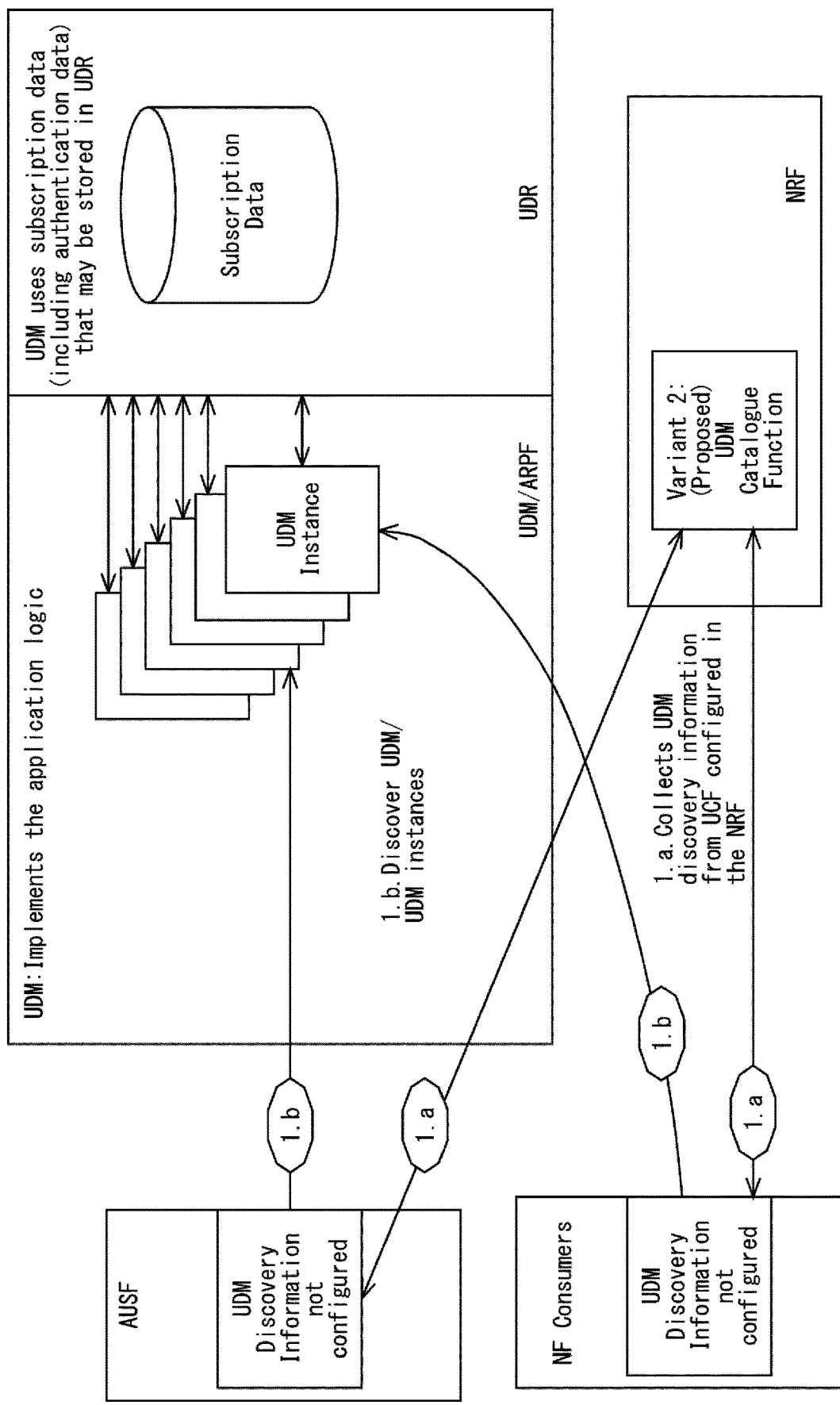
FIG. 3 is UCF based UDM instance discovery by AUSF or any NF consumer using NRF.

Whenever a UE's registration request or any request is received by an AUSF or UDM consumer with any one or combination of UDM routing information parameter listed in section 2.1, the UDM consumer may identify the UDM routing information or discovery information notified by the UE in the SUCI or any parameter in the request and then communicate with the NRF as shown in step 1.a and discover the right UDM instance as shown in step 1.b, in FIG. 3.

Figure 4:
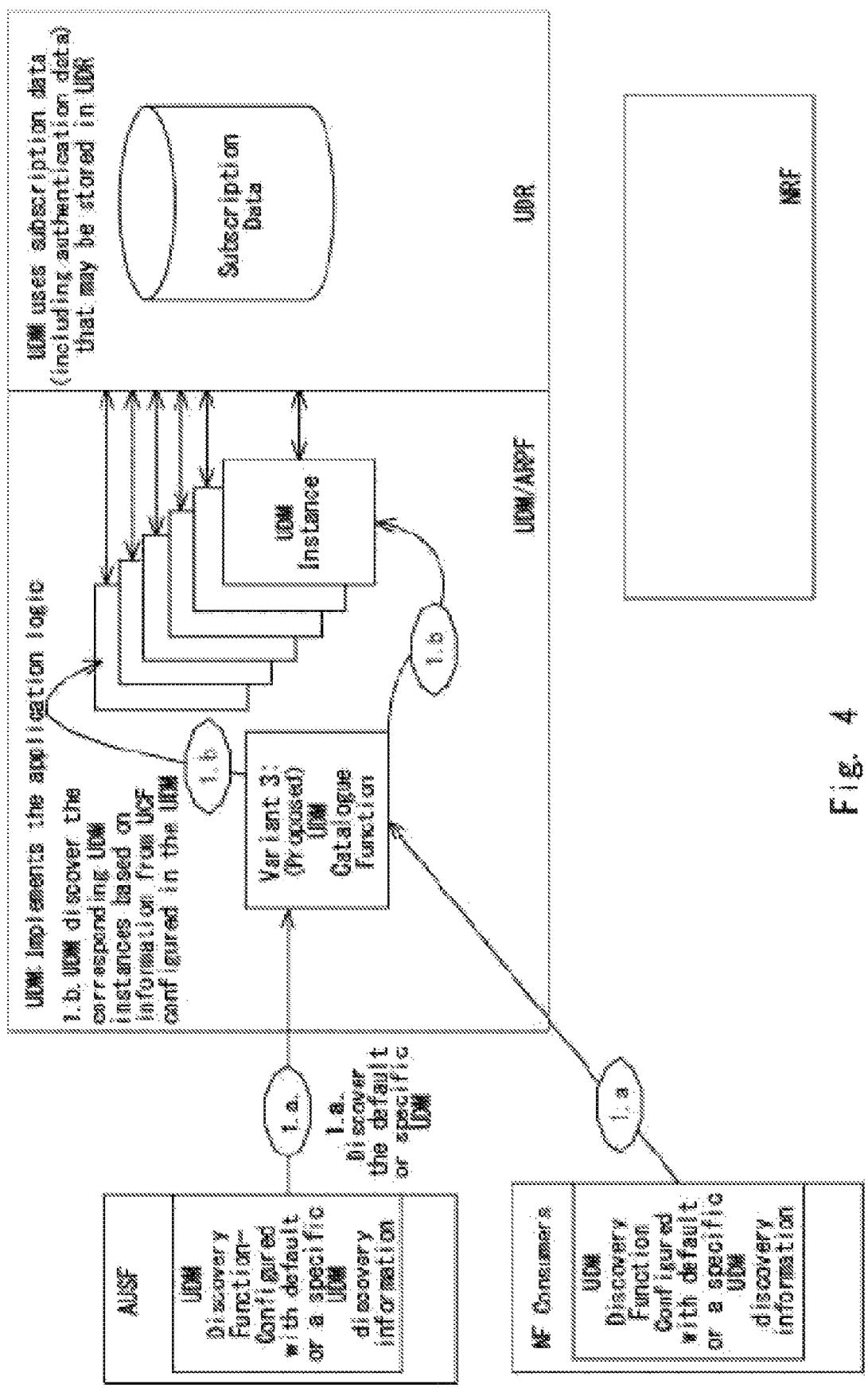
FIG. 4 is Default UDM discovery by NF consumers along with UCF based UDM instance discovery by UDM itself for any NF consumer.

2.1.1.3 UDM Catalogue Information Related Variant-3:

Whenever a UE's registration request received by the SEAF or any 5G-AIR request is received by an AUSF or any message received by an UDM consumer with any one or combination of UDM routing information parameter listed in section 2.1 along with SUCI, the UDM consumer may identify the UDM routing information or discovery information notified by the UE in the SUCI or any parameter in the request and then discover the default UDM or UDM instance manager as shown in step 1a in FIG. 4.

Variant: The UDM consumer/AUSF may also communicate with the NRF to find the default UDM instance or UDM manager.

Initially the SEAF/AUSF or any UDM consumer may discover the default UDM or a specific UDM instance (Which can acts as an UDM Manager) based on the routing information either configured in the UDM consumer or through NRF as defined in the Solution A (main).

Once the UDM is discovered, using the UDM instance information related UCF managed by the UDM (UDM instance manager), a more appropriate UDM instance may be discovered by the UDM (UDM Manager) itself. The UCF may be an information/functionality/service/instance to support right UDM instance selection based on the service requirement and other specific parameters managed in the UCF.

Variant: One UDM instance belonging to a UDM may perform the function of UCF within the UDM to select/discover the right UDM instance based on the UDMI ID, UCF data and other required service/functionalities.

2.1.1.4 UDM Catalogue Information Related Variant-4 [UDM Instance Selection by SEAF]:

Whenever a UE's registration request received by the AMF/SEAF contains a SUCI, the AMF/SEAF may act as the UDM consumer and discover/select the right UDM instance based on the UDM instance selection parameter in the received SUCI and the UDM catalogue information pre-configured at the SEAF.

If the AMF/SEAF is not locally configured with the UDM catalogue information, the AMF/SEAF may utilize the NRF locally configured with the UDM catalogue information to select the right UDM instance.

2.1.1.5 UDM Catalogue Information Related Variant-4 [With Standalone SIDF]:

Whenever a UE's registration request received by the AMF/SEAF contains a SUCI, the SEAF may send the SUCI with the 5G-AIR message to the AUSF.

The AUSF may discover the SIDF at the core network based on the protection scheme and/or the home network identifier.

The SIDF may be an core network element or function.

Variant: The SIDF may be collocated with UDM or SIDF may be located independently in the core network.

The SIDF may de-conceal the SUCI and the SIDF may act as the UDM consumer and discover/select the right UDM instance based on the SUPI range/subscription related to the SUPI.

Variant-1: The SIDF may be pre-configured with the UDM instance discovery information (UDM catalogue information) discussed in the section 2.1.1. The SIDF may select the UDM instance based on the SUPI and the pre-configure UDM instance discovery information.

Variant-2: The SIDF may act as the UDM consumer and may select/discover the right UDM instance through the NRF. The NRF may be pre-configured with the UDM instance discovery information (UDM catalogue information) discussed in the section 2.1.1.

2.2 Solution for Lack of Integrity and Confidentiality Protection for UDM Instances and UDM Instance Identifiers 2.2.1 Secret Instance Code Generation to Prevent Fake Instance Identifier and Attack on UDM Instances Every UDM instance may have an unique UDM instance identifier.

2.2.1.1 UDM Instance Identifier (UDM IID)

Where <UDMIID>=<UDM Identifier><Instance number><Secret Instance Code><Service/Function Identifier><Protection scheme Identifier>

A partial UDM IID may contain the UDM Identifier and the Instance number/Instance identifier.

The partial UDM IID may be pre-provisioned to the UE/USIM by any core network element or UDM/ARPF.

*<Secret Instance Code>=Home network specific UDM generated secret code to prevent fake instance ID and attacks on UDM instances

*<Service/Function Identifier>=Identifier of one or all functions or service offered by a particular UDM instance. Service/Function Identifier may be specific to other variants such as, a. Subscription type id (Normal/Premium/Any other based on SUPI)
b. Service type id (NSSAI/S-NSSAI(s))
c. IMSI or non-IMSI type id
d. Functionality id specific to the functions stated in TS 23.501 clause 6.2.7.
e. Authentication method(s) id(s)
f. Protection schemes and method(s) related id(s)
g. SUPI/IMSI Ranges
h. Access type id 2.2.1.2 UDM Discovery:

The UDM ID and the instance number may be pre-shared with the UE/USIM along with the SUPI protection scheme parameters to support the UDM/UDM instance discovery either by the UDM consumer or NRF or UDM/ARPF/or any core network element.

Reason: The UDM ID and the instance number alone is shared with UE and the rest of the parameters related to the UDMIID such as, the <Secret Instance Code><Protection scheme Identifier> and <Service/Function Identifier> are retained at the UDM/ARPF in the core network to prevent the attack on the UDM instances.

No UE as well as any elements other than the UDM/ARPF, and any elements outside the home network may not be given knowledge of the complete UDM IID (the <Secret Instance Code> and <Service/Function Identifier> corresponding to an UDM or UDM instance).

The pre-shared/configured UDM ID along with the instance number may be used only for the UDM instance discovery (as routing information) and the management of UDM instances at the UDM/ARPF may be based on the complete UDMIID.

Variant: The partial UDM IID received from the UE in SUCI may be used by the UDM consumers such as SEAF/AUSF/SIDF or NRF along with their pre-configured UDM instance routing information with UDM IID to discover/select the right UDM instance.

The UDMID and the instance number may act as the routing information to discover the right UDM instance.

Variant: UDM Instance Discovery ID/UDM Instance Routing ID=UDM ID||UDM Instance number.

To support the UDM discovery, the UE may send the received UDMID and the instance number along with the Registration Request message or any message in the SUCI as a sub-parameter or an individual parameter.

2.2.1.3 Secret Instance Code Generation

A periodic Secret instance code is generated as when an instance is created based on the inputs such as UDM root key||UDM consumer type/code/identifier/group identifier||instance count→ to a PRF or a KDF or any function to derive an identifier.

Variant 1: Secret instance code may be a static or dynamic code.

Variant 2: Secret instance code may be generated as when an instance is created based on any combination of one or many of the following inputs such as UDM root key, random number, UDM consumer type/code/identifier/group identifier, instance count to a PRF or a KDF or any function.

The instance count is incremented every time, a similar type of UDM instance is created within an UDM.

The UDM may generate and store the Message Authentication Code or hash of all/subset of/set of UDM instances and may periodically verify the integrity of its instance/instance identifiers to prevent the inclusion of fake identifiers by attackers.

The UDM and UDM instance management may depend on the complete UDM instance identifier involving the secret code.

2.2.2 UDM/UDM Instance Selection Parameter/Information Security

The UDM instance selection information/parameters sent in the SUCI or as an individual parameter by the UE may be integrity protected using any of the following. The core network element receiving the UDM Instance selection parameter and selecting the UDM instance may verify the integrity of the UDM Instance selection parameter before UDM/UDM instance selection. The security context required to perform this integrity verification at the core network element may be available at the core network element or may be provisioned by the home network UDM/ARPF.

pre-provisioned secret key, or
using a security context available at the UE, or
using a key derived from the HN public and UE private key or
using a key derived from the symmetric ephemeral key based on the protection scheme applied for SUCI construction.
using the key used in SUCI construction.

2.3 Solution for Lack of SUPI State (Concealed/Cleartext) Information for AUSF

During a re-authentication, if the AMF/SEAF has a valid 5G-GUTI, and then if AMF/SEAF include the SUPI (the one previously received from the AUSF during an initial/primary authentication) in the 5G-Authentication Initiation Request (5G-AIR) message to re-authenticate the UE, the AMF/SEAF may also include an indicator in the 5G-AIR message whether it has a SUPI in cleartext or in a concealed form (SUCI) to notify the AUSF.

An indicator may be used by the SEAF in 5G-AIR message to notify the AUSF if the SUPI is in cleartext or concealed form.

The IMSI/SUPI state indicator may be the indicator used to identify whether a SUPI is in a cleartext or concealed form.

Variant: The IMSI/SUPI state indicator may otherwise be termed as SUPI cleartext indicator.

IMSI/SUPI state indicator:

The IMSI/SUPI state indicator in a message (example. 5G-AIR) may be enabled to notify that an IMSI/SUPI is in clear text.

The IMSI/SUPI state indicator in a message (example. 5G-AIR) may be disabled to notify that an IMSI/SUPI parameter is in concealed form and has to be treated as a SUCI by the AUSF.

2.3.1 Usage of IMSI/SUPI state Indicator in Re-Authentication Scenario 2.3.1.1 Case 1: UE Sending 5G-GUTI in Registration Request During a re-authentication, if the AMF/SEAF has a valid 5G-GUTI, and then if AMF/SEAF include the SUPI (the one previously received from the AUSF during an initial authentication) in the 5G-AIR message to re-authenticate the UE, the AMF/SEAF may also include a IMSI/SUPI state indicator to notify the cleartext SUPI to the AUSF.

Figure 5:
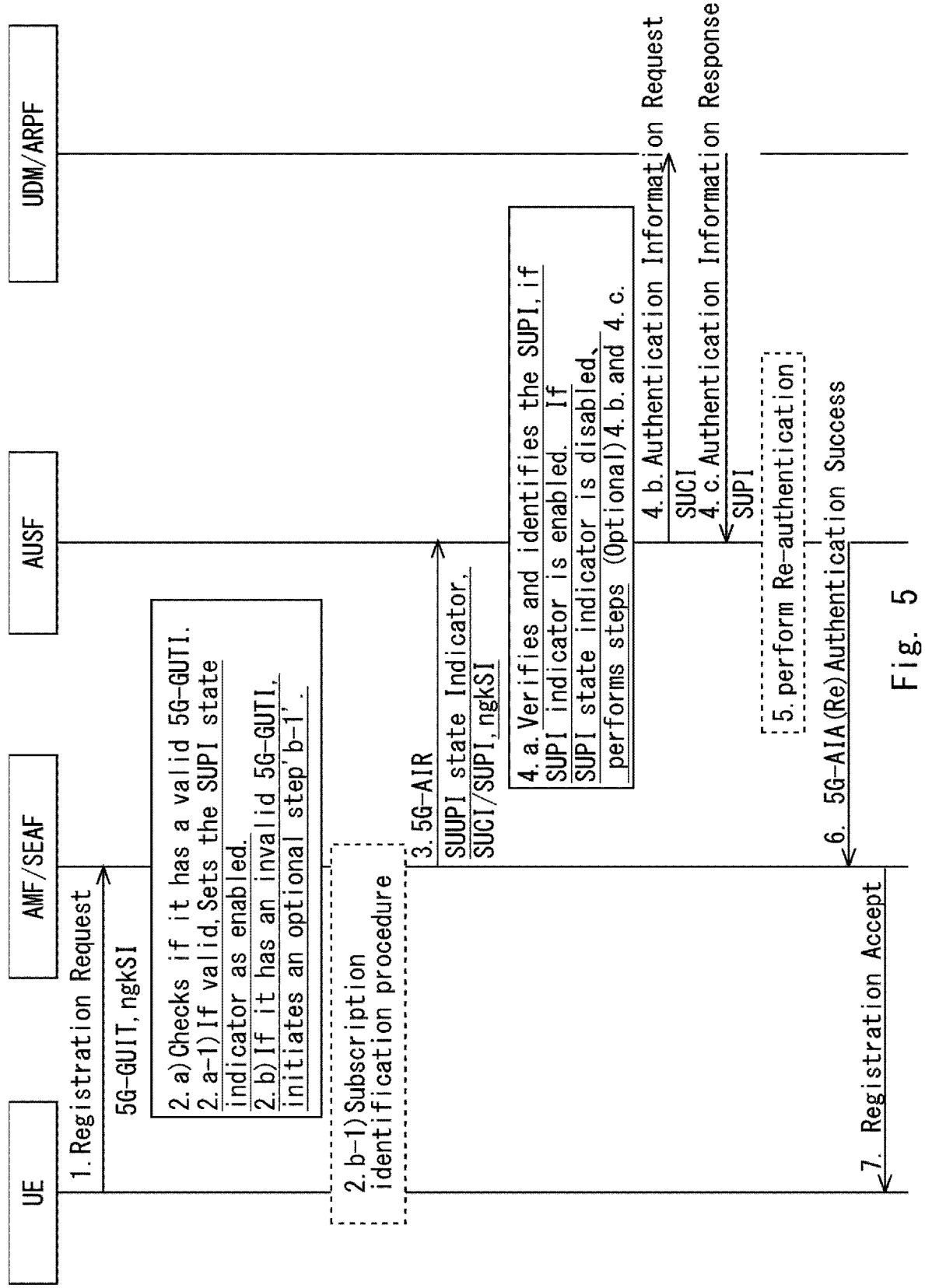
FIG. 5 is Usage of SUPI State Indicator during Registration with 5G-GUTI.

FIG. 5 indicates Usage of SUPI State Indicator during Registration with 5G-GUTI.

1. The UE may send the Registration Request with 5G-GUTI and ngKSI to the AMF/SEAF. The purpose of the ngKSI is to make it possible for the UE and the core network element to identify a security context and to allow re-use of the security context derived/shared during the initial/primary authentication during subsequent connection set-ups.

2. The AMF/SEAF may a) check if the received 5G-GUTI is valid and if it is valid, the SEAF may a-1) include the SUPI corresponding to the 5G-GUTI in the 5G-AIR message and may set the SUPI state indicator as enabled to notify the AUSF that 5G-AIR contains the clear text SUPI.

Variant: 2.b) If the AMF/SEAF finds the 5G-GUTI is invalid, then AMF/SEAF may trigger the 2.b-1) subscription identification procedure with the UE. The UE will return either SUPI/SUCI. If the UE return SUPI, the AMF/SEAF may include the SUPI with SUPI state indicator as enabled in the 5G-AIR message. If the UE returns SUCI, the AMF/SEAF may include the SUCI with SUPI state indicator as disabled in the 5G-AIR message.

3. The AMF/SEAF may send the 5G-AIR message to the AUSF with SUPI/SUCI along with the SUPI state indicator as enabled/disabled accordingly based on Step 2 and its variants conditions and the ngKSI.

4. a) The AUSF may identify and verify the SUPI if the SUPI state indicator is enabled.

Variant: 4b) & 4c) If the SUPI state indicator is disabled in the 5G-AIR message received, the AUSF may consider the SUPI/SUCI received in the 5G-AIR message as SUCI and trigger the Authentication information request/response message with the UDM/SIDF by sending the SUCI to de-conceal the SUCI.

5. The AUSF may perform the re-authentication based on the SUPI verification and ngKSI information.

6. Based on the re-authentication results, the AUSF may send the 5G-AIA message to the AMF/SEAF with (Re-)authentication Success or failure message accordingly.

7. The AMF/SEAF may send the Registration accept or reject message to the UE accordingly.

2.3.1.2 Case 2: UE Sending SUCI in Registration Request

During a re-authentication, if the UE sends a SUCI in the registration request message, then the AMF/SEAF may send the received SUCI in the 5G-AIR message along with a disabled IMSI/SUPI state indicator to notify the presence of concealed SUPI to the AUSF in the 5G-AIR message.

Figure 6:
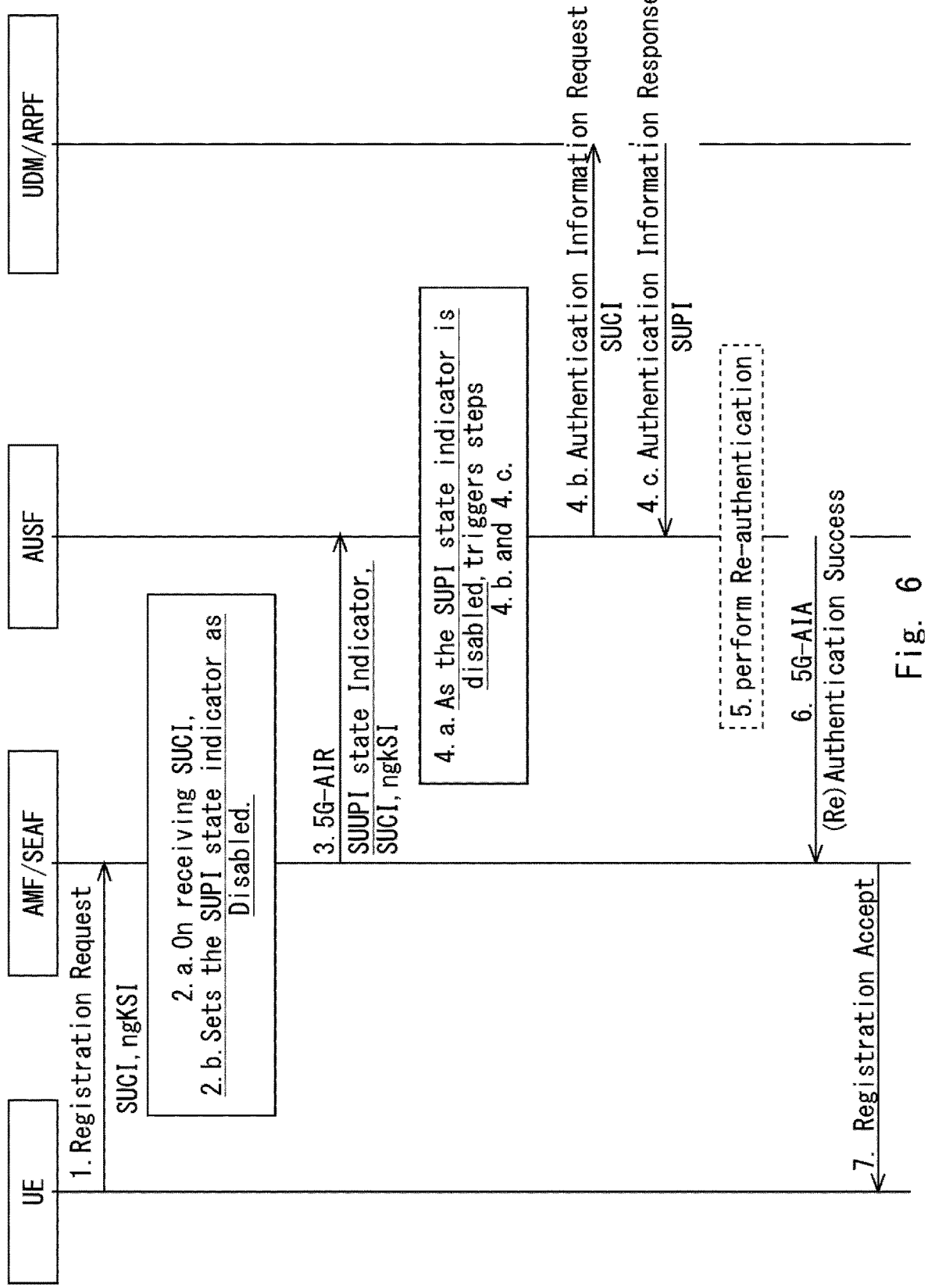
FIG. 6 is Usage of SUPI State Indicator during Registration with 5G-GUTI.

FIG. 6 indicates Usage of SUPI State Indicator during Registration with 5G-GUTI.

1. The UE may send the Registration Request with SUCI and ngKSI to the AMF/SEAF. The purpose of the ngKSI is to make it possible for the UE and the core network element to identify a security context and to allow re-use of the security context derived/shared during the initial/primary authentication during subsequent connection set-ups.

2. The AMF/SEAF on receiving the Registration Request with SUCI may set the SUPI state indicator as disabled.

3. The AMF/SEAF may send the 5G-AIR message with SUCI, ngKSI and SUPI state indicator as disabled to notify the AUSF that the 5G-AIR message contains a concealed SUPI.

4. As the SUPI state indicator is disabled in the 5G-AIR message received, the AUSF may trigger the Authentication information request/response message with the UDM/SIDF by sending the SUCI to de-conceal the SUCI.

5. The AUSF may perform the re-authentication based on the SUPI verification and ngKSI information.

6. Based on the re-authentication results, the AUSF may send the 5G-AIA message to the AMF/SEAF with (Re-)authentication Success or failure message accordingly.

7. The AMF/SEAF may send the Registration accept or reject message to the UE accordingly.

2.4 Solution for Re-Authentication Procedure with Proposed Parameters

The following proposed parameters may be used for Re-authentication following a primary authentication between UE and the 5G system.

a) Re-authentication Identifier
b) Re-authentication Token
a) Re-authentication Identifier (Re-auth ID):
Re-authentication Identifier may be bounded to the any one or combination of the following,
a) Identifier of the EAP method executed during the initial authentication, and
b) the 5G re-authentication code (Dynamic or Static)
b) Re-authentication Token (Re-auth Token):
Re-authentication Token may be bounded to any one or combination of the following, the $K_{AUSF}/K_{SEAF}$/any key derived during the primary initial authentication,
the SUPI, and
the 5G re-authentication code (Dynamic or Static)

2.4.1 Re-authentication Procedure for Case 1: UE Sending 5G-GUTI in Registration Request FIG. 7 indicates Usage of SUPI State Indicator during Registration with 5G-GUTI.

1. The UE may send the Registration Request with Re-auth ID, Re-auth Token, 5G-GUTI and ngKSI to the AMF/SEAF. The purpose of the ngKSI is to make it possible for the UE and the core network element to identify a security context and to allow re-use of the security context derived/shared during the initial/primary authentication during subsequent connection set-ups.

2. The AMF/SEAF may a) check if the received 5G-GUTI is valid and if it is valid, the SEAF may a-1) include the SUPI corresponding to the 5G-GUTI in the 5G-AIR message and may set the SUPI state indicator as enabled to notify the AUSF that 5G-AIR contains the clear text SUPI.

Variant: 2.b) If the AMF/SEAF finds the 5G-GUTI is invalid, then AMF/SEAF may trigger the 2.b-1) subscription identification procedure with the UE. The UE will return either SUPI/SUCI. If the UE return SUPI, the AMF/SEAF may include the SUPI with SUPI state indicator as enabled in the 5G-AIR message. If the UE returns SUCI, the AMF/SEAF may include the SUCI with SUPI state indicator as disabled in the 5G-AIR message.

3. The AMF/SEAF may send the 5G-AIR message to the AUSF with SUPI/SUCI along with the SUPI state indicator as enabled/disabled accordingly based on Step 2 and its variant conditions and the ngKSI.

4. a) The AUSF may identify and verify the SUPI if the SUPI state indicator is enabled.

Variant: 4b) & 4c) If the SUPI state indicator is disabled in the 5G-AIR message received, the AUSF may consider the SUPI/SUCI received in the 5G-AIR message as SUCI and trigger the Authentication information request/response message with the UDM/SIDF by sending the SUCI to de-conceal the SUCI.

5. The AUSF may verify the Re-Auth ID and SUPI. If the verification is successful, the AUSF may derive the Re-auth Token corresponding to the SUPI and perform the re-authentication by verifying the derived Re-auth Token with the one received in the 5G-AIR message. The AUSF may use the received ngKSI information to identify the $K_{AUSF}$ and $K_{SEAF}$ corresponding to the successful primary authentication. The AUSF may further derive the re-authentication key from the key left at AUSF ($K_{AUSF}$) or $K_{SEAF}$ along with the re-authentication count as the freshness parameter.

Variant: The $K_{AUSF}/K_{SEAF}$ derived during the initial authentication may be used in r-$K_{AUSF}$F/r-$K_{SEAF}$ generation along with re-authentication count as a freshness parameter.

Variant: The re-authentication master key r-$K_{AUSF}$ may be stated as K'$_{AUSF}$ and the re-authentication anchor key r-$K_{SEAF}$ may be stated as K'$_{SEAF}$.

6. Based on the re-authentication results, the AUSF may send the 5G-AIA message to the AMF/SEAF with (Re-) authentication Success or failure message accordingly.

7. The AMF/SEAF may send the Registration accept or reject message to the UE accordingly.

8. After a successful re-authentication, the UE may derive the re-authentication master or anchor key similar to the AUSF.

2.4.2 Re-Authentication Procedure for Case 2: UE Sending SUCI in Registration Request FIG. 8 indicates Usage of SUPI State Indicator during Registration with 5G-GUTI.

1. The UE may send the Registration Request with Re-auth ID, Re-auth Token, SUCI and ngKSI to the AMF/SEAF. The purpose of the ngKSI is to make it possible for the UE and the core network element to identify a security context and to allow re-use of the security context derived/shared during the initial/primary authentication during subsequent connection set-ups.

2. The AMF/SEAF on receiving the Registration Request with SUCI may set the SUPI state indicator as disabled.

3. The AMF/SEAF may send the 5G-AIR message with Re-auth ID, Re-auth Token, SUCI, ngKSI and SUPI state indicator as disabled to notify the AUSF that the 5G-AIR message contains a concealed SUPI.

4. As the SUPI state indicator is disabled in the 5G-AIR message received, the AUSF may trigger the Authentication information request/response message with the UDM/SIDF by sending the SUCI to de-conceal the SUCI.

5. The AUSF may verify the Re-Auth ID and SUPI. If the verification is successful, the AUSF may derive the Re-auth Token corresponding to the SUPI and perform the re-authentication by verifying the derived Re-auth Token with the one received in the 5G-AIR message. The AUSF may use the received ngKSI information to identify the $K_{AUSF}$ and $K_{SEAF}$ corresponding to the successful primary authentication. The AUSF may further derive the re-authentication key from the key left at AUSF ($K_{AUSF}$) or $K_{SEAF}$ along with the re-authentication count as the freshness parameter.

Variant: The $K_{AUSF}$/$K_{SEAF}$ derived during the initial authentication may be used in r-$K_{AUSF}$/r-$K_{SEAF}$ generation along with re-authentication count as a freshness parameter.

Variant: The re-authentication master key r-$K_{AUSF}$ may be stated as K'AUSF and the re-authentication anchor key r-$K_{SEAF}$ may be stated as K'$_{SEAF}$.

6. Based on the re-authentication results, the AUSF may send the 5G-AIA message to the AMF/SEAF with (Re-) authentication Success or failure message accordingly.

7. The AMF/SEAF may send the Registration accept or reject message to the UE accordingly.

8. After a successful re-authentication, the UE may derive the re-authentication master or anchor key similar to the AUSF.

3.1 This Disclosure Includes:

1) Proposed parameters to act as a UDM or UDM instance routing information
2) Proposed methods to perform UDM instance discovery by various network elements such as, the UDM Consumer, NRF and/or by the UDM itself
3) Proposed UDM routing information pre-provisioning method to the UE/USIM by the core network element.
4) Proposed complete UDM instance identifier generation and related security mechanism to prevent attack on UDM instances and identifiers, and malicious inclusion of fake UDM instance identifiers.
5) Proposed method to indicate the AUSF if the SUPI sent in 5G-AIR message is in clear text or concealed form.
6) Proposed security parameters and procedures for re-authentication between UE and the 5G core (5G system).

3.2 This Disclosure Includes:

Method for Provision of UDM instance discovery information Comprising the steps of, 1) Pre-provisioning of UDM instance discovery/routing information to the UE by the core network/operator/or by any other. The UDM instance discovery/routing information may be any one or combination of the following parameters:
   a. UDM Identifier||Instance number or Instance Identifier
   b. IMSI or SUPI Range indicator
   c. Access/IMSI types
   d. Protection scheme
   e. Service type
   f. A random number 2) The UE may include any one or combination of the following UDM instance discovery/routing related parameters in the Registration request message or in any message while sending SUCI.
   a. UDM Identifier||Instance number or Instance identifier
   b. IMSI or SUPI Range indicator
   c. Access/IMSI types
   d. Protection scheme
   e. Service type
   f. A random number 3) The UDM instance discovery/routing parameter may be sent by the UE to the core network as an individual parameter or sub-parameter of SUCI.

4) The UDM instance discovery/routing/selection/identification parameter/information may be a part of any parameter, or an individual parameter or part of SUCI sent from the UE, 5) The UDM Catalogue information or function may support along with the UDM instance discovery/routing parameter to find the right UDM instance. The UCF may contain the following information and it may be managed either by the UDM consumer or NRF or the UDM or by all the three network element.
   a) Complete UDM IID, UDM ID
   b) UDM IID(s) along with the further information for discovery of an UDM instance such as,
   1. UDM (Instance) Functionality,
   2. authentication method types,
   3. privileged subscriptions,
   4. normal subscriptions,
   5. subscription types,
   6. IMSI/SUPI range identifiers
   7. UDM/UDM instance Invocation count
   8. Service types 6) The UDM consumer by itself or along the NRF may discover the right UDM instance based on the received UDM instance discovery information from the UE and the UCF.
   a. Variant: The UDM consumer may discover the right UDM instance based on the received UDM instance discovery information from the UE and the UCF.
   b. Variant: The NRF may discover the right UDM instance based on the received UDM instance discovery information from the UE and the UCF.
   c. Variant: The UDM consumer or the NRF may discover the default UDM or UDM instance or UDM instance manager based on the received UDM instance discovery information from the UE and then discover the appropriate UDM instance based on the UCF.

d. Variant: Any Network function or its instance identification/discovery/selection/routing may follow the similar procedures and information exchanges proposed for the right UDM instance selection.

Method for UDM, UDM instance and UDM instance identifier protection against malicious attack Comprising the steps of, 1) Complete UDM instance identifier (UDM IID) generation using any of the combination of the following parameters such as, UDM Identifier, Instance number, Secret Instance Code, Service Identifier, Function Identifier, and Protection scheme Identifier (may be specific to any usage or SUPI protection).

2) The partial/basic UDM IID may contain the UDM Identifier and Instance number/Instance Identifier.

3) Secret Instance Code may be the Home network specific UDM generated secret code to prevent fake instance ID and attacks on UDM instances.

4) The UDMID and the instance number may act as the routing information to discover the right UDM instance.

5) The Secret Instance Code Generation may be generated by the UDM/ARPF as discussed in the section 1.2.1.3.

6) The UDM may generate and store the MAC of all/subset of/set of UDM instances and may periodically verify the integrity of its instance/instance ids to prevent the inclusion of fake identifiers by attackers.

7) The UDM and UDM instance management may depend on the UDM instance identifier involving the secret code.

Proposed method to indicate the AUSF if the SUPI sent in 5G-AIR message is in clear text or concealed form.

Comprising the steps of,

1) The SEAF may indicate the AUSF if the SUPI/SUCI is sent in the 5G-AIR message or any other message is in clear text or concealed form using an indicator called SUPI state indicator or SUPI clear text indicator.

Proposed parameters and security procedures for re-authentication between UE and the 5G core (5G system).

Comprising the steps of,

1) The UE may re-authenticate with the network using the Re-auth ID and Re-auth Token.

2) The UE and the network may derive the re-authentication keys such as $K'_{AUSF}$ and/or $K'_{SEAF}$ using the key $K_{AUSF}$ and/or $K_{SEAF}$ derived during the initial/primary authentication.

This application is based upon and claims the benefit of priority from Indian patent applications No. 201841005986, filed on Feb. 16, 2018, the disclosure of which is incorporated herein in its entirety by reference.

The invention claimed is:

1. A communication apparatus comprising:
a memory; and
at least one hardware processor coupled to the memory, wherein the at least one hardware processor is configured to:
  obtain routing information related to a Unified Data Management (UDM) instance; and
  send first information in a registration request message, the first information comprising:
    an identifier comprising one of: a part of an International Mobile Subscription Identity (IMSI) and a non-IMSI,
    the routing information, and
    type information indicating whether a type of the identifier is IMSI or non-IMSI.

2. The communication apparatus according to claim 1, wherein the routing information and second information referring to one or more UDM instances are used for selecting or discovering a network apparatus.

3. The communication apparatus according to claim 2, wherein the second information is sent by a Network Repository Function (NRF).

4. The communication apparatus according to claim 2, wherein the network apparatus includes a UDM or a UDM instance.

5. The communication apparatus according to claim 1, wherein the first information is a Subscription Concealed Identifier (SUCI).

6. The communication apparatus according to claim 1, wherein the at least one hardware processor is configured to receive the routing information from an Access and Mobility Management Function (AMF).

7. The communication apparatus according to claim 1, wherein the routing information is configured in a Network Repository Function (NRF).

8. The communication apparatus according to claim 1, wherein the identifier comprises one of:
a Mobile Country Code (MCC) part and a Mobile Network Code (MNC) part of the IMSI; and
the non-IMSI.

9. A first network apparatus comprising:
a receiver configured to receive first information in a registration request message, the first information comprising:
  an identifier comprising one of: a part of an International Mobile Subscription Identity (IMSI) and a non-IMSI,
  routing information related to a Unified Data Management (UDM) instance, and
  type information indicating whether a type of the identifier is IMSI or non-IMSI,
wherein the receiver is configured to receive second information referring to one or more UDM instances from a Network Repository Function (NRF); and
a processor configured to select a second network apparatus based on the routing information and the second information.

10. The first network apparatus according to claim 9, wherein the first information is a Subscription Concealed Identifier (SUCI).

11. The first network apparatus according to claim 9, wherein the second network apparatus includes a UDM or a UDM instance.

12. The first network apparatus according to claim 9, wherein the identifier comprises one of:
a Mobile Country Code (MCC) part and a Mobile Network Code (MNC) part of the IMSI; and
the non-IMSI.

13. A method of a communication apparatus, the method comprising:
obtaining routing information related to a Unified Data Management (UDM) instance; and
sending first information in a registration request message, the first information comprising:
  an identifier comprising one of: a part of an International Mobile Subscription Identity (IMSI) and a non-IMSI, the routing information, and
type information indicating whether a type of the identifier is IMSI or non-IMSI.

14. The method according to claim 13, wherein the routing information and second information referring to one or more UDM instances are used for selecting or discovering a network apparatus.

15. The method according to claim 14, wherein the second information is sent by a Network Repository Function (NRF).

16. The method according to claim 14, wherein the network apparatus includes a UDM or a UDM instance.

17. The method according to claim 13, wherein the first information is a Subscription Concealed Identifier (SUCI).

18. The method according to claim 13, further comprising receiving the routing information from an Access and Mobility Management Function (AMF).

19. The method according to claim 13, wherein the routing information is configured in a Network Repository Function (NRF).

20. The method according to claim 13, wherein the identifier comprises one of:
a Mobile Country Code (MCC) part and a Mobile Network Code (MNC) part of the IMSI; and
the non-IMSI.

21. A method of a first network apparatus, the method comprising:
receiving first information in a registration request message, the first information comprising:
an identifier comprising one of: a part of an International Mobile Subscription Identity (IMSI) and a non-IMSI,
routing information related to a Unified Data Management (UDM) instance, and
type information indicating whether a type of the identifier is IMSI or non-IMSI;
receiving second information referring to one or more UDM instances from a Network Repository Function (NRF); and
selecting a second network apparatus based on the routing information and the second information.

22. The method according to claim 21, wherein the first information is a Subscription Concealed Identifier (SUCI).

23. The method according to claim 21, wherein the second network apparatus includes a UDM or a UDM instance.

24. The method according to claim 21, wherein the identifier comprises one of:
a Mobile Country Code (MCC) part and a Mobile Network Code (MNC) part of the IMSI; and
the non-IMSI.

* * * * *